3,136,641
METHOD OF TREATING EGGS
Martin G. Koesterer and Erwin T. Fritzsching, Rochester, N.Y., assignors to Wilmot Castle Company, Rochester, N.Y., a corporation of New York
No Drawing. Filed Mar. 29, 1963, Ser. No. 269,180
10 Claims. (Cl. 99—161)

The present invention relates to treating eggs and more specifically to decontamination of liquid egg whites, yolks or whole eggs.

The presence of Salmonellae, Pseudomonas and other harmful microorganisms in fresh, frozen or dried eggs has been a continuing and very serious health problem.

Several methods are now in common use for decontaminating liquid egg white, but none of them are entirely satisfactory. Those in which a heat treatment is used destroys vitamins, denatures proteins and other salutory constituents and at least deprives them of their freshness.

The use of ultraviolet irradiation and/or biological or chemical decontaminants, if used in sufficient quantities to be effective, so adversely affect the flavor and taste or other physical or functional properties as to be objectionable. Moreover, the quantities of these substances required to insure safety from infection or food poisoning are in excess of acceptable standards established by the Federal Drug and Food Administration for food additives.

It is therefore an object of this invention to provide an improved method of effectively decontaminating eggs without danger to the health of the human consumer and without modifying the flavor or functional properties of the eggs.

Another object of this invention is the provision of egg whites, yolks or whole eggs which are substantially free of living microorganisms while still in their fresh, frozen, or spray-dried condition.

Another object of the invention is to provide a novel method utilizing ultraviolet irradiation and/or heat in reduced quantities and in combination with Beta-propiolactone to accomplish the decontamination or sterilization of the above mentioned products without the normal disadvantages of those decontaminating agents.

Other objects and advantages of this invention will be particularly set forth in the claims and will be apparent from the following description:

According to this invention by which liquid eggs are effectively decontaminated, there is added to the liquid egg whites, yolks, or whole eggs from 0.05 to 1.0% by volume Beta-propiolactone, hereinafter referred to as BPL, the mixture is then gently agitated sufficiently to mix uniformly but without foaming. Thereafter, the mixture is maintained for a treatment period of from 20 minutes to 5 hours. The longer treatment time being desirable to complete the hydrolysis of BPL to hydracrylic acid. BPL may be added in an aqueous solution of suitable dilution to give the desired ratio by volume of BPL to the mixture with eggs. The hydrolysis reaction of BPL to hydracrylic acid is substantially according to the following equation:

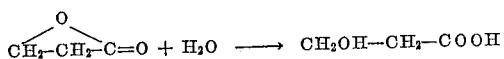

The water entering into the reaction is derived from the liquid egg itself, and the end product, beta-hydroxypropionic acid an isomer of lactic acid is non-toxic and not carcinogenic when consumed by the human body as a minor constituent of food.

The temperature at which this treatment preferably may be carried out is within a range from 5° C. to 55° C. If the treatment consists of combining the effects of lower concentrations of the BPL with the added effect of a heating process below the temperature of denaturation of the protein, or with the use of ultraviolet irradiation, then the treatment temperatures should be within a range of 5° C. to 61° C.

With increasing temperatures up to 61° C., the rate of lactone hydrolysis is faster than the rate of disinfection. Thus, a given number of lactone molecules can destroy more vegetative bacteria held at low temperatures than at high temperatures since the lactone is less susceptible to hydrolysis at the lower temperatures.

It has been discovered that the minimal lactone concentration preventing outgrowth was between 0.05 and 0.06%. The findings indicate that concentration of lactone of 0.1% or less will destroy low levels of salmonellae contamination in eggs and that necessary lactone concentrations between 0.05 and 0.1% in eggs may be approximately determined by a microbiological assay with Salmonellae.

It was observed that greater concentrations than 0.4% by volume BPL resulted in some precipitation of proteinaceous matter when egg whites only or whole eggs were being treated. However, if egg yolks only are being treated, there is no precipitation of lipid matter of which the yolks are composed. The desirable upper limit for treatment of egg yolks only is 1.0%, above which treated eggs are not palatable. Therefore, the desirable range of concentration for effective decontamination is between 0.05% and 1.0% BPL by volume.

The method is carried out in a closed atmosphere to prevent recontamination. Once the BPL has hydrolyzed according to the above equation, then the eggs may become re-infected. By reason of this reaction whereby the end product is rendered non-toxic and fit for human consumption, there is no continuing decontamination effect once the treatment is finished. This means that it is necessary to package the eggs in their final form in a sealed container. It is plausible to add BPL to the egg material, package almost immediately, allow enough time in the package for completion of reaction prior to human consumption.

One very important aspect of this invention resides in the discovery that the chemical reaction of BPL with egg whites, yolks or whole eggs does not modify the original flavor nor functional characteristics thereof. This is a very important discovery because unlike many products to be decontaminated, toxicity is not the only problem. Where food products are concerned, decontamination must be accomplished without changing the flavor to which humans are accustomed, and the functional characteristics must not change in foods, such as eggs which are used in baking.

Through experimentation, it has been discovered that BPL chemical reacts with other foods in a manner which causes flavor changes, thereby rendering BPL an unsatisfactory food additive in many foods. It was only through experimentation that this method has proved a satisfactory method for decontaminating eggs as opposed to foods generally.

It will be understood that, where used in the claims, the word "eggs" shall be construed to include egg whites or egg yolks or whole eggs.

We shall now describe an example of our invention. Freshly separated liquid egg white seeded with various levels of bacterial contamination (1–1.5 × 10⁵ Salmonellae cells per ml.) is treated in a closed system with the following concentrations of BPL (by volume) agitated slightly so as to disperse the chemical uniformly, but not enough to cause foaming. This treatment then consists of holding and/or heat treating at various temperatures (5° C. to 61° C.) for various times. Aliquots were taken at various times and assayed for sterility in tubes of cystine-selenite broth and trypticase soy broth. Results of the various treatments are given below:

Concentration of
lactone, percent v./w.:  Treatment to Sterilize 0.05 _____ Count reduced 50% in 2 hours at 10° C. Sterility not attained in 8 hours at 10° C. After holding at 10° C. for 8 hours, then heating at 45° C. for 1 minute sterility was not obtained.

0.1 _____ 10–12 hours at 10° C. sterilized. 5–6 hours at 10° C., then 1 minute at 45° C. sterilized.

0.2 _____ 2–3 hours at 10° C. sterilized. 1.5 hours at 10° C., then 1 minute at 45° C. sterilized.

0.3 _____ 2–3 hours at 10° C. sterilized. 0.5 hour at 10° C., then 1 minute at 45° C. sterilized.

While we have shown and described the preferred form of mechanism of our invention, it will be apparent that various modifications and changes may be made therein, particularly in the form and relation of parts, without departing from the spirit of the invention as set forth in the appended claims.

We claim:

1. A method of treating eggs comprising mixing substantially 0.05% to 1.0% Beta-propiolactone by volume with liquid eggs while maintaining the mixture at a selected temperature substantially within a range of 5° C. to 61° C. thereby decontaminating the same.

2. A method of treating eggs comprising mixing substantially 0.5% to 1.0% Beta-propiolactone by volume with liquid eggs while maintaining the mixture at a selected temperature substantially within a range of 5° C. to 61° C. in a closed atmosphere for a preselected treatment period during hydrolysis, thereby decontaminating the same.

3. A method in accordance with claim 2 including a final step of sealing the decontaminated eggs in their final form against recontamination.

4. A method of treating eggs comprising mixing an aqueous solution of substantially 0.05% to 1.0% Beta-propiolactone by volume with liquid eggs while maintaining the mixture at a selected temperature substantially within a range of 5° C. to 61° C. thereby decontaminating the same.

5. A method of treating eggs comprising mixing an aqueous solution of substantially 0.05% to 1.0% Beta-propiolactone by volume with liquid eggs while maintaining the mixture at a selected temperature substantially within a range of 5° C. to 61° C. in a closed atmosphere for a preselected treatment period during hydrolysis, thereby decontaminating the same.

6. A method in accordance with claim 5 including a final step of sealing the decontaminated eggs in their final form against recontamination.

7. A method of treating eggs comprising mixing substantially 0.05% to 1.0% Beta-propiolactone by volume with liquid eggs, and subjecting said mixture to ultraviolet irradiation while maintaining said mixture at a selected temperature substantially within a range of 5° C. to 61° C. thereby decontaminating the same.

8. A method of treating eggs comprising mixing substantially 0.05% to 1.0% Beta-propiolactone by volume with liquid eggs, and subjecting said mixture to ultraviolet irradiation while maintaining said mixture at a selected temperature substantially within a range of 5° C. to 61° C. in a closed atmosphere for a preselected treatment period during hydrolysis, thereby decontaminating the same.

9. A method in accordance with claim 8 including a final step of sealing the decontaminated eggs in their final form against recontamination.

10. A method of treating eggs comprising mixing substantially 0.05% to 1.0% Beta-propiolactone by volume with liquid eggs while maintaining the mixture at a selected temperature below that temperature at which denaturization of eggs occurs thereby decontaminating the same, but not below 5° C.

References Cited in the file of this patent
UNITED STATES PATENTS

| | | |
|---|---|---|
| 2,776,214 | Lloyd et al. | Jan. 1, 1957 |
| 3,028,245 | Mink et al. | Apr. 3, 1962 |
| 3,050,405 | Hopper | Aug. 21, 1962 |

OTHER REFERENCES

"The Condensed Chemical Dictionary," 1956, 5th Edition, by A. and E. Rose, published by Reinhold Publishing Corporation, New York, pages 166 and 170.

UNITED STATES PATENT OFFICE
CERTIFICATE OF CORRECTION

Patent No. 3,136,641            June 9, 1964

Martin G. Koesterer et al.

It is hereby certified that error appears in the above numbered patent requiring correction and that the said Letters Patent should read as corrected below.

Column 3, line 41, for "0.5%" read -- 0.05% --.

Signed and sealed this 10th day of November 1964.

(SEAL)
Attest:

ERNEST W. SWIDER
Attesting Officer

EDWARD J. BRENNER
Commissioner of Patents